(12) United States Patent  
Blanco Blanco et al.

(10) Patent No.: US 9,942,192 B2  
(45) Date of Patent: Apr. 10, 2018

(54) PROVISION OF PUBLIC SERVICE IDENTITIES

(71) Applicant: TELEFONAKTIEBOLAGET LM ERICSSON (PUBL), Stockholm (SE)

(72) Inventors: Germán Blanco Blanco, Paracuellos del Jarama (ES); Timo Forsman, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/163,081

(22) Filed: May 24, 2016

(65) Prior Publication Data

US 2016/0301657 A1 Oct. 13, 2016

Related U.S. Application Data

(63) Continuation of application No. 14/147,828, filed on Jan. 6, 2014, now Pat. No. 9,380,450, which is a continuation of application No. 12/064,955, filed as application No. PCT/SE2005/001207 on Aug. 12, 2005, now Pat. No. 8,655,325.

(51) Int. Cl.
| | |
|---|---|
| *H04L 12/58* | (2006.01) |
| *H04W 4/00* | (2018.01) |
| *H04L 29/12* | (2006.01) |
| *H04L 29/08* | (2006.01) |
| *H04W 8/20* | (2009.01) |
| *H04W 8/04* | (2009.01) |
| *H04W 8/26* | (2009.01) |
| *H04W 4/02* | (2018.01) |

(52) U.S. Cl.
CPC .... *H04L 61/1541* (2013.01); *H04L 29/08108* (2013.01); *H04L 29/12113* (2013.01); *H04L 67/16* (2013.01); *H04L 67/30* (2013.01); *H04W 8/04* (2013.01); *H04W 8/20* (2013.01); *H04W 4/02* (2013.01); *H04W 8/26* (2013.01)

(58) Field of Classification Search
CPC .................................................. H04L 29/12113
USPC .............................. 455/414.1, 432.3, 435.1
See application file for complete search history.

(56) References Cited

U.S. PATENT DOCUMENTS

| 8,655,325 B2 * | 2/2014 | Blanco Blanco . H04L 29/12113 455/414.1 |
| 9,380,450 B2 * | 6/2016 | Blanco Blanco . H04L 29/12113 |
| 2008/0032695 A1 | 2/2008 | Zhu et al. |

(Continued)

OTHER PUBLICATIONS

3GPP. 3rd Generation Partnership Project Technical Specification Group Services and System Aspects; IP Multimedia Subsystem (IMS): Stage 2 (Release 6). 3GPP TS 23.228 v6.9.0 (Mar. 2005).

(Continued)

*Primary Examiner* — William D Cumming

(57) ABSTRACT

A mechanism to handle Public Service Identities identifying services in a network when a given Public Service Identity (PSI) belongs to a range of Public Service Identities defined as a 'Wildcard PSI' range. An enhanced Home Subscriber Server, serving entity, and routing entity, all co-operating to carry out the invention by handling an identifier of the 'Wildcard PSI' range, which includes the given Public Service Identity, the 'Wildcard PSI' range being associated with a common service profile to be applied for services identified by those Public Service Identities belonging to the 'Wildcard PSI' range.

8 Claims, 7 Drawing Sheets

(56) References Cited

U.S. PATENT DOCUMENTS

| | | | |
|---|---|---|---|
| 2009/0215453 A1* | 8/2009 | Blanco Blanco | H04L 29/12113 455/435.1 |
| 2009/0227236 A1 | 9/2009 | Sanchez Herrero et al. | |
| 2010/0325275 A1 | 12/2010 | Van Elburg et al. | |
| 2011/0134843 A1 | 6/2011 | Noldus et al. | |
| 2012/0011273 A1 | 1/2012 | Van Elburg et al. | |
| 2014/0113624 A1* | 4/2014 | Blanco Blanco | H04L 29/12113 455/432.3 |
| 2016/0301657 A1* | 10/2016 | Blanco Blanco | H04L 29/12113 |

OTHER PUBLICATIONS

3GPP. 3rd Generation Partnership Project; Technical Specification Group Core Network and Terminals: IP Multimedia (IM) Subsystem Sh interface; Signalling flows and message contents (Release 6) 3GPP TS 29.328 V6.6.0, Jun. 2005 (Jun. 2005), pp. 1-36, XP014031026.

Digital cellular telecommunications system (Phase 2+): Universal Mobile Telecommunications System (UMTS: IP Multimedia Subsystem (IMS); Stage 2 (3GPP TS 23.228 version 6.9:0 Release 6) ETSI TS 123 228 V6.9.0, Mar. 2005 (Mar. 2005). pp. 1-179, XP014027532.

* cited by examiner

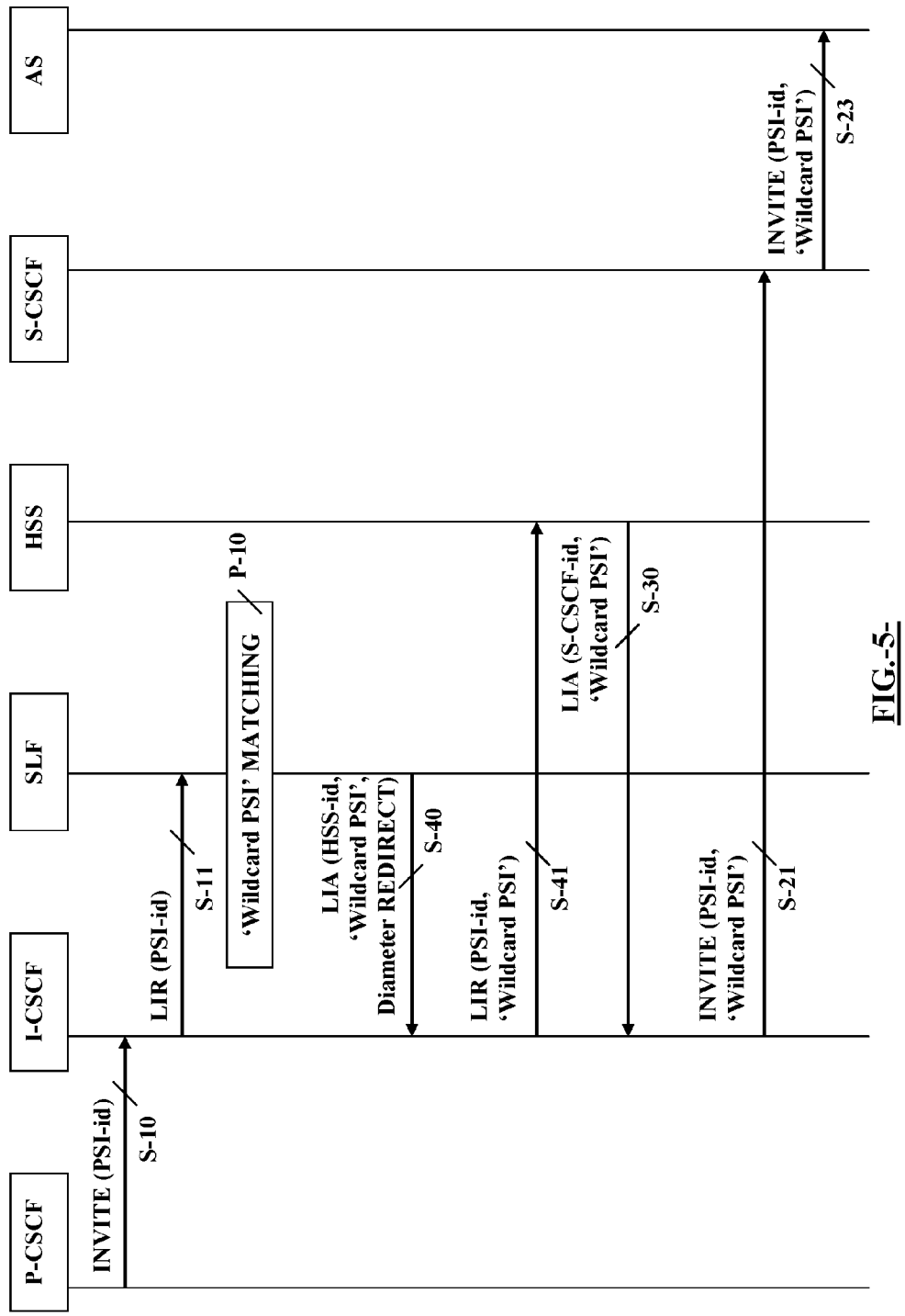
FIG.-5-

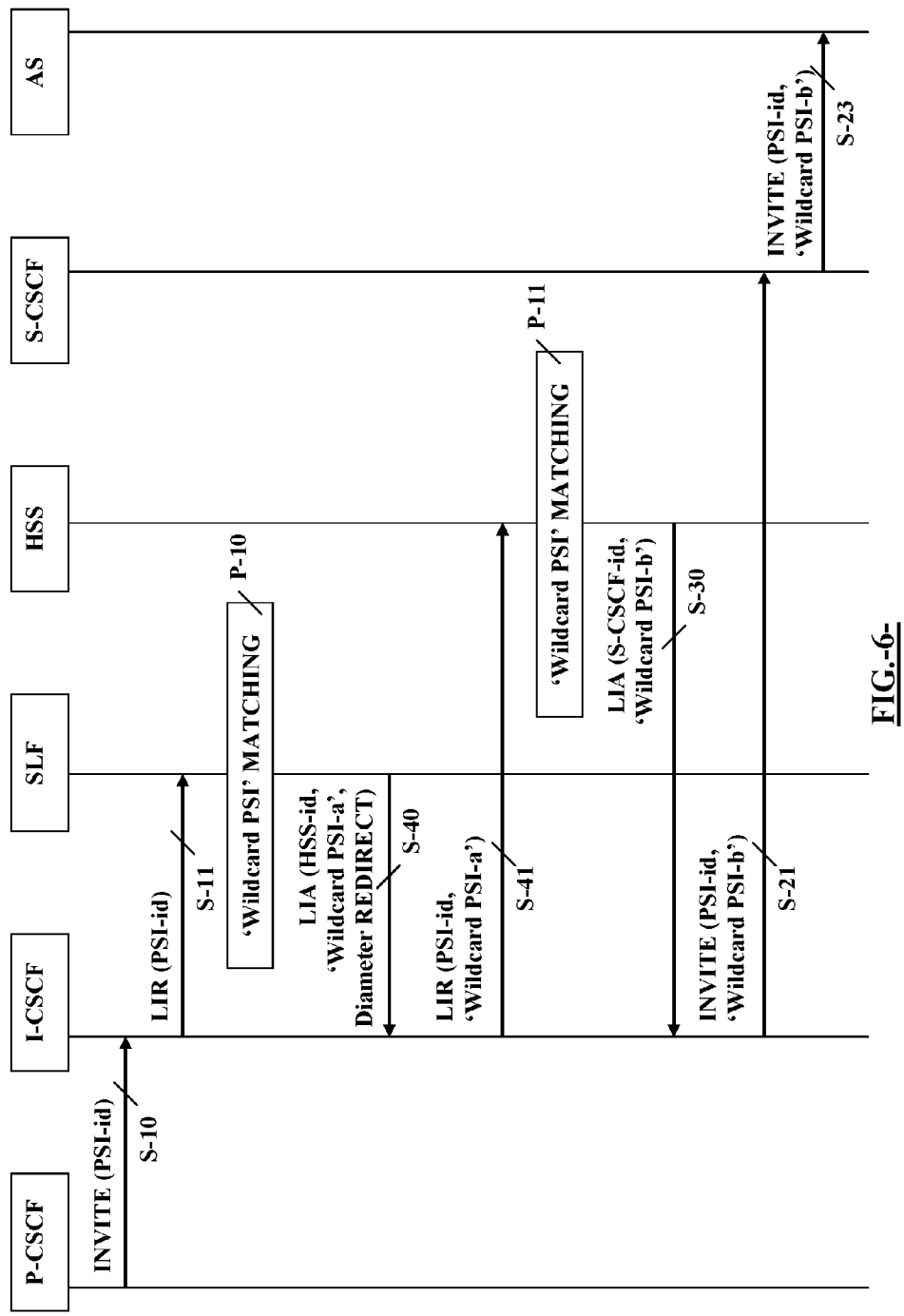
FIG.-6-

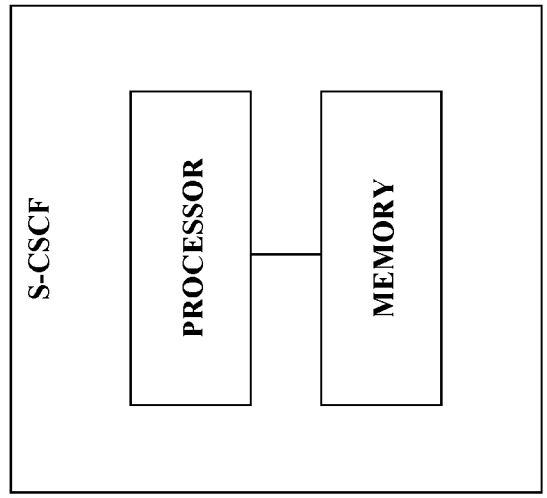
FIG.-9-
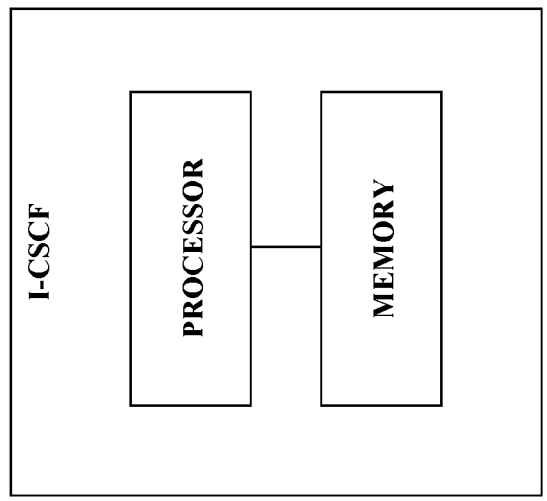
FIG.-8-
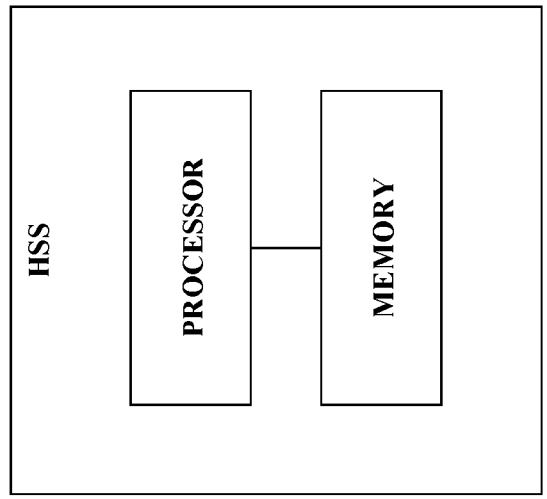
FIG.-7-

PROVISION OF PUBLIC SERVICE IDENTITIES

RELATED APPLICATIONS

This application is a continuation of co-pending U.S. patent application Ser. No. 14/147,828 filed on Jan. 6, 2014, which is a continuation of U.S. patent application Ser. No. 12/064,955 filed on Jul. 2, 2008, now U.S. Pat. No. 8,655, 325, which is a 371 of International Application No. PCT/SE2005/001207, filed Aug. 12, 2005, the disclosures of which are fully incorporated herein by reference.

FIELD OF THE INVENTION

The present invention generally relates to invocation of services that are identified by respective Public Service Identities. In particular, the present invention relates to the routing of Public Service Identities that belong to a range of Public Service Identities held as a so-called 'Wildcard PSI', the range sharing a service profile.

BACKGROUND

At present, the $3^{rd}$ Generation Partnership Project (generally known as '3GPP') has introduced the basis for an IP Multimedia Subsystem (generally known as 'IMS') and IMS services, as stated in the technical specification 3GPP TS 23.228 V6.9.0. In accordance with 3GPP, Public Service Identities are different from Public User Identities in the respect that the former identify services, which may be hosted and operated by application servers (generally known as 'AS' in at least said 3GPP technical specification), whereas the latter identify users whose subscription data are hosted in subscriber databases under network operator premises, and who are served by different serving network nodes such as a Serving Call Session Control Function (known as 'S-CSCF' under 3GPP). A definition of the terms 'Service' and 'user', as used throughout this specification can be found in 3GPP TS 21.905: "Vocabulary for 3GPP Specifications".

Generally speaking, Public Service Identities are used to identify services running on specific application servers. In particular, Public Service Identities are used to identify groups of services such as a chat-type service, for instance, that may use a Public Service Identity (hereinafter referred to as 'PSI') to which the users may establish a session in order to enable the sending and reception of messages from other session participants. Public Service Identities are presently assumed to take the form of SIP URL or SIP URI as defined by the Internet Engineering Task Forces (IETF) in RFC 3261 and RFC 2396, as well as in the so-called 'tel:'-URI format as defined in RFC 3966. An exemplary Public Service Identity (PSI) identifying a chat-type service may be sip:chatlist_X@example.com.

Public User Identities can adopt two different forms of representation and scope. A first one is a so-called 'Distinct PSI', such as sip:my_service@example.com, and determines an individual Public Service Identity representing a unique service and which can be individually invoked. A second scope and form of representation is a so-called 'Wildcard PSI', such as sip:chatlist_*@example.com may be, wherein a range of Public User Identities is defined with a same domain part in the SIP URI and with a wildcard indication in the user part of the SIP URI. An interested reader may find definitions for 'Distinct PSI' and 'Wildcard PSI' through the technical specification 3GPP TS 23.003.

In this respect, an individual Public Service Identity might have been defined independently as a 'Distinct PSI', or might have been defined within a 'Wildcard PSI' range, which implicitly includes a plurality of Public Service Identities within the range.

In operation, the IMS provides the means for routing IMS messages related to particular IMS services by using corresponding Public Service Identities.

Therefore, Public Service Identities are stored in a Home Subscriber Server (generally known as 'HSS' under 3GPP specifications) holding subscription data for subscribers of a home network operator. A service may be invoked by a user accessing IMS through a Proxy Call Session Control Function (known as 'P-CSCF' under 3GPP) by using a given Public Service Identity. This invocation is received at a routing entity of the home network, preferably an Interrogating Call Session Control Function (known as 'I-CSCF' under 3GPP), which interrogates the HSS about the given Public Service Identity. The HSS checks whether the given Public Service Identity is defined in the HSS in order to find an S-CSCF already assigned for handling the given Public Service Identity, or an application server where the corresponding service runs if the network is configured for such direct invocation, or server capabilities required for selecting an S-CSCF if such serving entity is not assigned yet for the given Public Service Identity.

If no S-CSCF was already assigned at the HSS for handling the given Public Service Identity, the server capabilities received at the I-CSCF are used to select an appropriate S-CSCF for handling the service. The service invocation with the given Public Service Identity is forwarded to the selected S-CSCF, which informs the HSS in order to be assigned therein as currently serving the given Public Service Identity. As for the previous interrogation, the HSS checks whether the given Public Service Identity is defined in the HSS in order to mark the assigned S-CSCF, and in order to fetch an applicable service profile for the given Public Service Identity to be returned towards the S-CSCF.

This service profile includes an identifier of the Application Server where the corresponding service is executed so that, once the applicable service profile for the given Public Service Identity is obtained at the S-CSCF, the S-CSCF may forward the invocation of the service towards the Application Server indicated in the service profile. The Application Server (generally abbreviated as "AS") then checks whether the given Public Service Identity is defined and fetches the logic to be executed for the given Public Service Identity.

With the currently existing mechanism, the routing of an invocation of service identified by a Public Service Identity includes at least two checking procedures in the HSS in order to match the given Public Service Identity with those Public Service Identities defined in the HSS, and one checking procedure in the AS in order to fetch the service logic associated with the given Public Service Identity. These checking procedures may become more complex than expected as trying to match the given Public Service Identity against all the individually defined Public Service Identities and against those Public Service Identities implicitly defined within a so-called 'Wildcard PSI' range.

These three checking procedures are increased to, at least, four checking procedures in networks where more than one HSS exists since, prior to interrogate an HSS about a Public Service Identity, the routing entity should firstly interrogate a central entity in the network about the Public Service Identity in order to obtain an identifier of the HSS holding such Public Service Identity. In such scenario with more than one HSS, Public Service Identities might have been defined in any HSS of the network, individually as a 'Distinct PSI' or within a 'Wildcard PSI' range, and a checking procedure is required at least four times in order to identify relevant data to apply for a given Public Service Identity.

Moreover, each service profile received for a given Public Service Identity at the S-CSCF is stored therein so that further invocations with respective Public Service Identities may not require download of a service profile if a service profile were already stored for each Public Service Identity.

SUMMARY OF THE INVENTION

The present invention is aimed to simplify this mechanism in such a manner that the needs for checking procedures in different network entities, and the needs for storage of service profiles in every S-CSCF, are minimized. In particular, the present invention is aimed to provide a simplified mechanism to handle Public Service Identities identifying services in a network when a given Public Service Identity (PSI) belongs to a range of Public Service Identities defined as a so-called 'Wildcard PSI' range.

Therefore, the present invention provides a new method, a new central entity in the network, and enhanced Home Subscriber Server, serving entity and routing entity, all co-operating to carry out different embodiments for the invention.

In accordance with a first aspect of the present invention, there is provided a central entity for handling Public Service Identities in a network with several Home Subscriber Servers, wherein a Public Service Identity identifies a service and is held by a Home Subscriber Server. This central entity comprises to this end:

means for associating a Public Service Identity with an identifier of the Home Subscriber Server holding the Public Service Identity;

means for answering a routing query based on a given Public Service Identity with the identifier of the Home Subscriber Server holding the Public Service Identity;

means for distinguishing whether the given Public Service Identity is held as a 'Distinct PSI', or the Public Service Identity belongs to a range of Public Service Identities held as a 'Wildcard PSI'; and means for answering the routing query also with the identifier of the 'Wildcard PSI', which the Public Service Identity belongs to.

This central entity may advantageously include means for associating with the Public Service Identity an identifier of an application server executing the service identified by the Public Service Identity. Moreover, the central entity may as well include means for instructing the Home Subscriber Server to associate the Public Service Identity with the identifier of the application server executing the service.

On the other hand, the central entity may be designed in such manner that the Home Subscriber Server assigned to hold an individual Public Service Identity is the Home Subscriber Server assigned to hold a 'Wildcard PSI' range that includes the individual Public Service Identity.

A dedicated device may be provided to act as this central entity in accordance with the invention, or other different network entities may be arranged for this purpose. For example, this central entity may be also arranged for carrying out a subscription locator function and, to this end, the central entity may have means for answering a routing query for a given Public User Identity with an identifier of a Home Subscriber Server holding the subscription for the corresponding user.

In accordance with a second aspect of the present invention, there is provided a Home Subscriber Server for holding Public Service Identities in a network, wherein each Public Service Identity identifying a service can be assigned to a serving entity. Therefore, the Home Subscriber Server comprises:

means for responding a routing query from a routing entity, the routing query based on a given Public Service Identity, either with an identifier of a serving entity already assigned for the Public Service Identity, or with capabilities required for selecting the serving entity;

means for distinguishing whether the given Public Service Identity is held as a 'Distinct PSI', or the given Public Service Identity belongs to a range of Public Service Identities held as a 'Wildcard PSI'; and means for including in the response to the routing query an identifier of the 'Wildcard PSI' range, which the given Public Service Identity belongs to.

This Home Subscriber Server may also include:

means for associating each individual Public Service Identity held as a 'Distinct PSI' with a particular service profile for executing the service; and means for associating a range of Public Service Identities held as a 'Wildcard PSI' with a common service profile applicable for any Public Service Identity belonging to the 'Wildcard PSI'.

Moreover, regarding the handling of the above particular and common service profiles, the Home Subscriber Server may further include:

means for providing the particular service profile upon a query with the individual Public Service Identity held as a 'Distinct PSI', or upon any change of contents in the particular service profile; and means for providing the common service profile upon a query with any Public Service Identity belonging to the 'Wildcard PSI', or upon any change of contents in the common service profile.

Additional advantages may be obtained regarding the distribution of Public Service Identities between different Home Subscriber Servers with help of the above central entity if the Home Subscriber Server is provided with means for receiving a routing query from a routing entity, the routing query based on a first 'Wildcard PSI' which is a sub-range of a second 'Wildcard PSI' as defined in the Home Subscriber Server. Moreover, an easier implementation may be achieved by having in the Home Subscriber Server means for assigning a serving entity for handling Public Service Identities included in a 'Wildcard PSI' range upon receipt of an indication from the serving entity of being currently holding the 'Wildcard PSI' range.

In accordance with a third aspect of the present invention, there is provided a serving entity assignable for handling a service identified by a Public Service Identity. Therefore, this serving entity comprises:

means for receiving an invocation of a service identified by a given Public Service Identity;

means for receiving with the invocation an identifier of a 'Wildcard PSI' range which the given Public Service Identity belongs to; and means for informing to a Home Subscriber Server holding Public Service Identities in a network of being the serving entity currently holding the 'Wildcard PSI' range.

This serving entity may advantageously comprise means for determining whether a service profile is already available for the given Public Service Identity, or a common service profile is already available for the 'Wildcard PSI' range, so that unnecessary download are minimized.

Nevertheless, the serving entity may be enhanced to further comprise means for obtaining from a Home Subscriber Server a common service profile associated with the 'Wildcard PSI' range.

Moreover, and especially applicable for services running in an external Application Server, the serving entity may also comprise means for forwarding the received service invocation towards an Application Server for executing the service identified by the given Public Service Identity, the invocation including the identifier of the 'Wildcard PSI' range which the given Public Service Identity belongs to.

Particularly applicable to an IMS network, as presently described under 3GPP specifications, this serving entity may be a Serving Call Session Control Function.

In accordance with a fourth aspect of the present invention, there is provided a routing entity for routing an invocation of a service identified by a Public Service Identity in a network towards a serving entity assignable for handling the service. Therefore, the routing entity comprises:

means for receiving an invocation of a service identified by a given Public Service Identity;

means for obtaining from a Home Subscriber Server holding the given Public Service Identity either an identifier of a serving entity already assigned for the given Public Service Identity, or capabilities required for selecting a serving entity;

means for forwarding the received invocation of service towards a selectable serving entity;

means for receiving, from a network entity holding the given Public Service Identity, an identifier of a 'Wildcard PSI' range which the given Public Service Identity belongs to; and means for including in the invocation forwarded towards the serving entity the identifier of the 'Wildcard PSI' range, which the Public Service Identity belongs to.

Particularly interesting for networks with more than one Home Subscriber Server, the routing entity may be such that the means for receiving an identifier of a 'Wildcard PSI' range also includes means for obtaining from a central entity an identifier of the Home Subscriber Server holding the given Public Service Identity.

This routing entity may be such that comprises means for receiving from the central entity a 'Wildcard PSI' range. Moreover, the routing entity may further comprise means for interrogating the Home Subscriber Server about a serving entity assignable for the indicated 'Wildcard PSI' range, received from the central entity and which the Public Service Identity belongs to.

In this respect, the identifier of the 'Wildcard PSI' range to be included in the invocation forwarded by this routing entity is the one received from the Home Subscriber Server.

Additional advantages may be still obtained if the means included at the routing entity for sending a routing a query towards the Home Subscriber Server includes means for obtaining from the above central entity an identifier of the Home Subscriber Server holding the Public Service Identity.

Particularly applicable to an IMS network, as presently described under 3GPP specifications, this routing entity may preferably be an Interrogating Call Session Control Function.

Apart from the co-operating entities cited above to achieve the objects of the invention, there is also provided in accordance with a fifth aspect of the invention a method for invoking a service identified by a Public Service Identity in a network, the service being handled by a serving entity and the Public Service Identity being held at a Home Subscriber Server. This method comprises the steps of:

receiving an invocation of a service identified by a given Public Service Identity at a routing entity;

interrogating a Home Subscriber Server holding the given Public Service Identity about a serving entity assignable for handling the given Public Service Identity;

forwarding the received invocation of service towards the assignable serving entity;

answering the interrogation with an identifier of a 'Wildcard PSI' range which the given Public Service Identity belongs to;

forwarding the identifier of the 'Wildcard PSI' range towards the assignable serving entity; and assigning a common service profile to the 'Wildcard PSI' to be applicable for Public Service Identities included in the 'Wildcard PSI' range.

Particularly interesting for networks with more than one Home Subscriber Server, the method may further comprise a step of interrogating a central entity about the Home Subscriber Server holding the given Public Service Identity; and a step of receiving an identifier of the Home Subscriber Server. Moreover, this method may also comprise a step of receiving from the central entity an identifier of a first 'Wildcard PSI' range, which the given Public Service Identity belongs to.

Aligned with advantageous embodiments for the above entities, the step of interrogating a Home Subscriber Server about a serving entity, in this method, may comprise a step of forwarding the identifier of a first 'Wildcard PSI' range received from the central entity. In this case, the step of answering the interrogation with an identifier of a 'Wildcard PSI' range may include a step of matching the first 'Wildcard PSI' as a sub-range of a second 'Wildcard PSI' to be returned with the answer.

BRIEF DESCRIPTION OF DRAWINGS

The features, objects and advantages of the invention will become apparent by reading this description in conjunction with the accompanying drawings, in which:

FIG. 5 illustrates a basic signalling flow describing how a given Public Service Identity belonging to a 'Wildcard PSI' range may be treated in a network with more than one HSS in accordance with a third embodiment of the invention.

FIG. 6 illustrates a basic signalling flow describing how a given Public Service Identity belonging to a 'Wildcard PSI' range may be treated in a network with more than one HSS in accordance with a fourth embodiment of the invention.

FIG. 7 illustrates a functional block diagram of an HSS as including a processor and a memory.

FIG. 8 illustrates a functional block diagram of an I-CSCF as including a processor and a memory.

FIG. 9 illustrates a functional block diagram of an S-CSCF as including a processor and a memory.

DETAILED DESCRIPTION OF PREFERRED EMBODIMENTS

The following describes some preferred embodiments for providing a simplified mechanism for handling Public Service Identities that are defined in a Home Subscriber Server within respective 'Wildcard PSI' ranges. For the purpose of the present invention a 'Wildcard PSI' range may adopt, among others, any of the following formats: Range*; *Range; and Range1*Range2.

Figure 1:
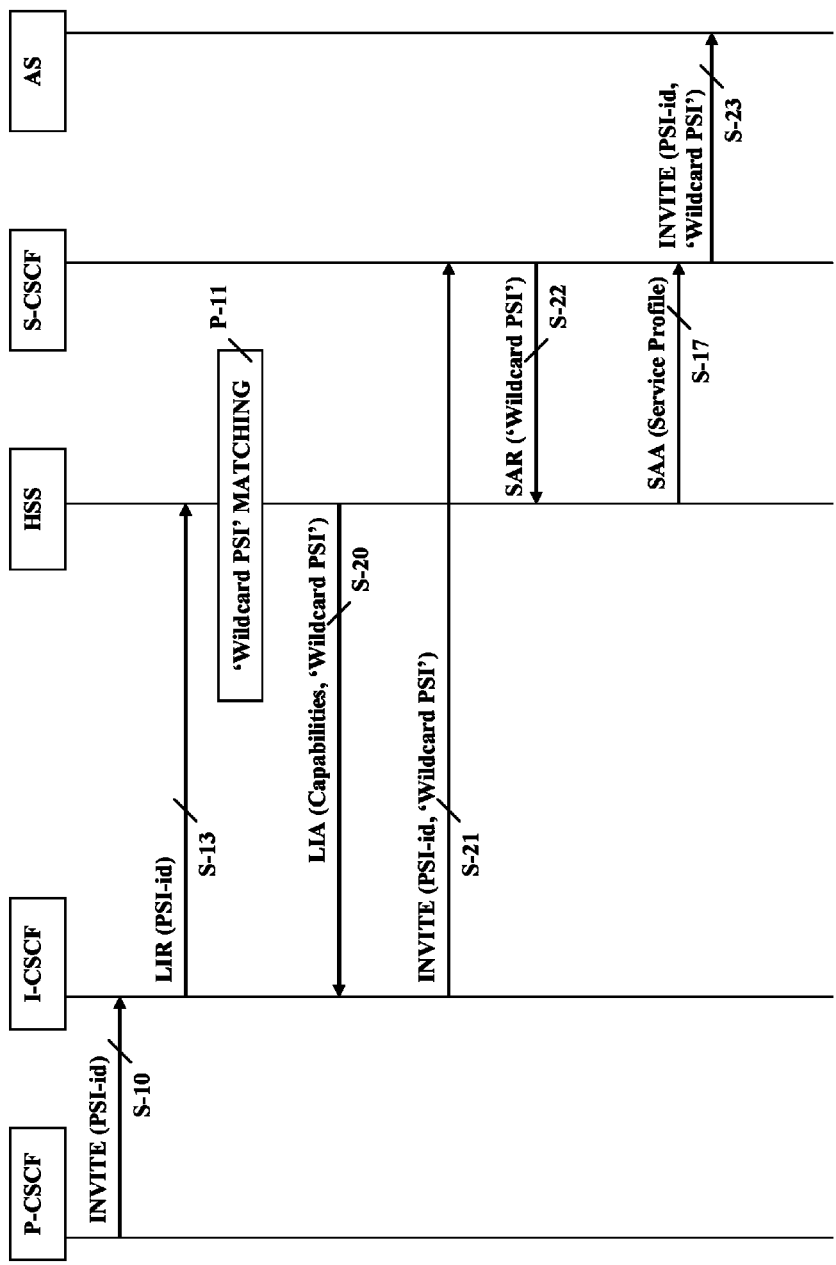
FIG. 1 illustrates a basic signalling flow describing how a given Public Service Identity belonging to a 'Wildcard PSI' range may be treated in a network with only one HSS in accordance with a first embodiment of the invention.

In accordance with a first embodiment illustrated in FIG. 1 wherein there is a unique Home Subscriber Server (HSS) in the IMS network, a routing entity such as an Interrogating Call Session Control Function (I-CSCF) defined under 3GPP receives (S-10) a service invocation (INVITE) addressing a given Public Service Identity (PSI-id). The routing entity (I-CSCF) interrogates (S-13) the HSS preferably with a Location Info Request (LIR) that includes the given Public Service Identity (PSI-id). Under this embodiment relevant for the purpose of the present invention, the HSS finds that this given Public Service Identity (PSI-id) is not defined as a 'Distinct PSI' but matches a 'Wildcard PSI'. The HSS also finds that this 'Wildcard PSI' has not being assigned yet any S-CSCF.

The HSS then returns back (S-20) to the interrogating and routing entity (I-CSCF) server capabilities required to select an appropriate serving entity (S-CSCF) and includes in accordance with the invention the 'Wildcard PSI', which the given Public Service Identity (PSI-id) belongs to. The server capabilities and the 'Wildcard PSI' may be preferably sent in a Location Info Answer (LIA). The routing entity (I-CSCF) selects an appropriate serving entity (S-CSCF) harmonizing with the received server capabilities, and forwards (S-21) the service invocation (INVITE) to the selected serving entity (S-CSCF), and including the received 'Wildcard PSI' along with the given Public Service Identity (PSI-id).

The selected serving entity (S-CSCF) receiving the service invocation informs (S-22) about its selection to the HSS, preferably with a Server Assignment Request (SAR), and including the received 'Wildcard PSI' instead of, or along with, the given Public Service Identity (PSI-id).

In accordance with an aspect of the present invention the HSS has each 'Wildcard PSI' associated with a common service profile applicable to all individual Public Service Identities that belong to, or are included in, said 'Wildcard PSI'. Consequently, the HSS assigns an identifier (S-CSCF-id) of the serving entity (S-CSCF), which is currently handling not only the given Public Service Identity but also all Public Service Identities belonging to the 'Wildcard PSI', to said 'Wildcard PSI'. Then, the HSS returns back (S-17) to the serving entity (S-CSCF) the common service profile associated to the 'Wildcard PSI', preferably with a Service Assignment Answer (SAA).

The serving entity (S-CSCF) receiving the common service profile stores it in association with the 'Wildcard PSI' for further applicable invocations; it gets, among the service data included in the service profile, an identifier of an Application Server (AS) where a service identified by the given Public Service Identity (PSI-id) is executed; and it eventually forwards (S-23) the service invocation (INVITE) to said Application Server (AS) including the received 'Wildcard PSI'.

The Application Server (AS) receiving the 'Wildcard PSI' may, under particular criteria and implementation options, apply unique service logic for all Public Service Identities within the received 'Wildcard PSI' so that no further checking and matching procedure is required.

Figure 2:
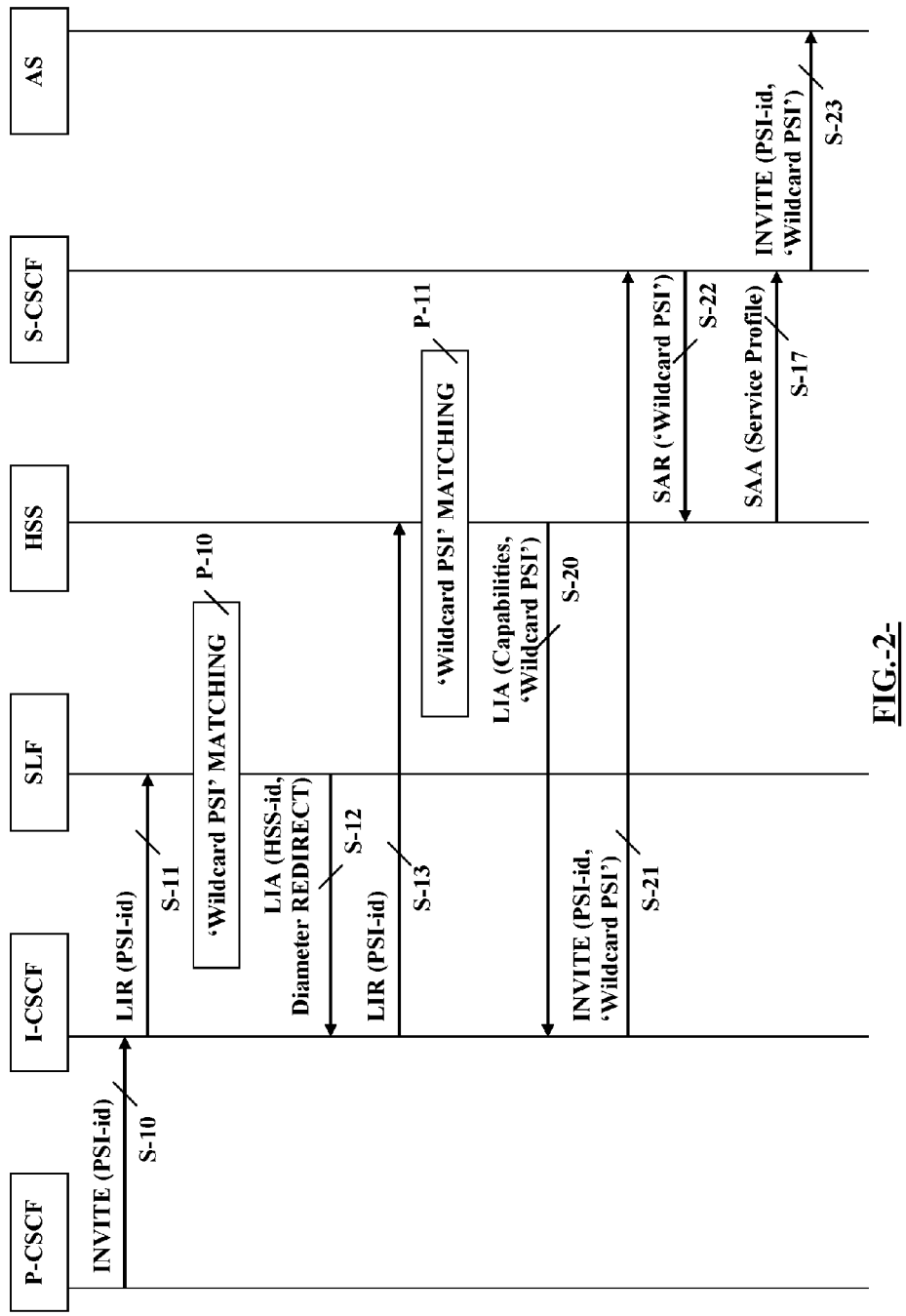
FIG. 2 illustrates a basic signalling flow describing how a given Public Service Identity belonging to a 'Wildcard PSI' range may be treated in a network with more than one HSS in accordance with a first embodiment of the invention.

Also under this embodiment and now considering the case of an architecture with more than one HSS, FIG. 2 illustrates how the routing entity (I-CSCF) firstly interrogates (S-11) a central network entity (SLF) preferably with a Location Info Request (LIR) that includes the given Public Service Identity (PSI-id) in order to identify the HSS currently holding the given Public Service Identity (PSI-id). The central network entity (SLF) returns (S-12) an indication to redirect the service invocation towards an indicated HSS (HSS-id), preferably with a Location Info Answer (LIA). Then, the procedure goes on as described above under the sequence illustrated in FIG. 1.

Figure 3:
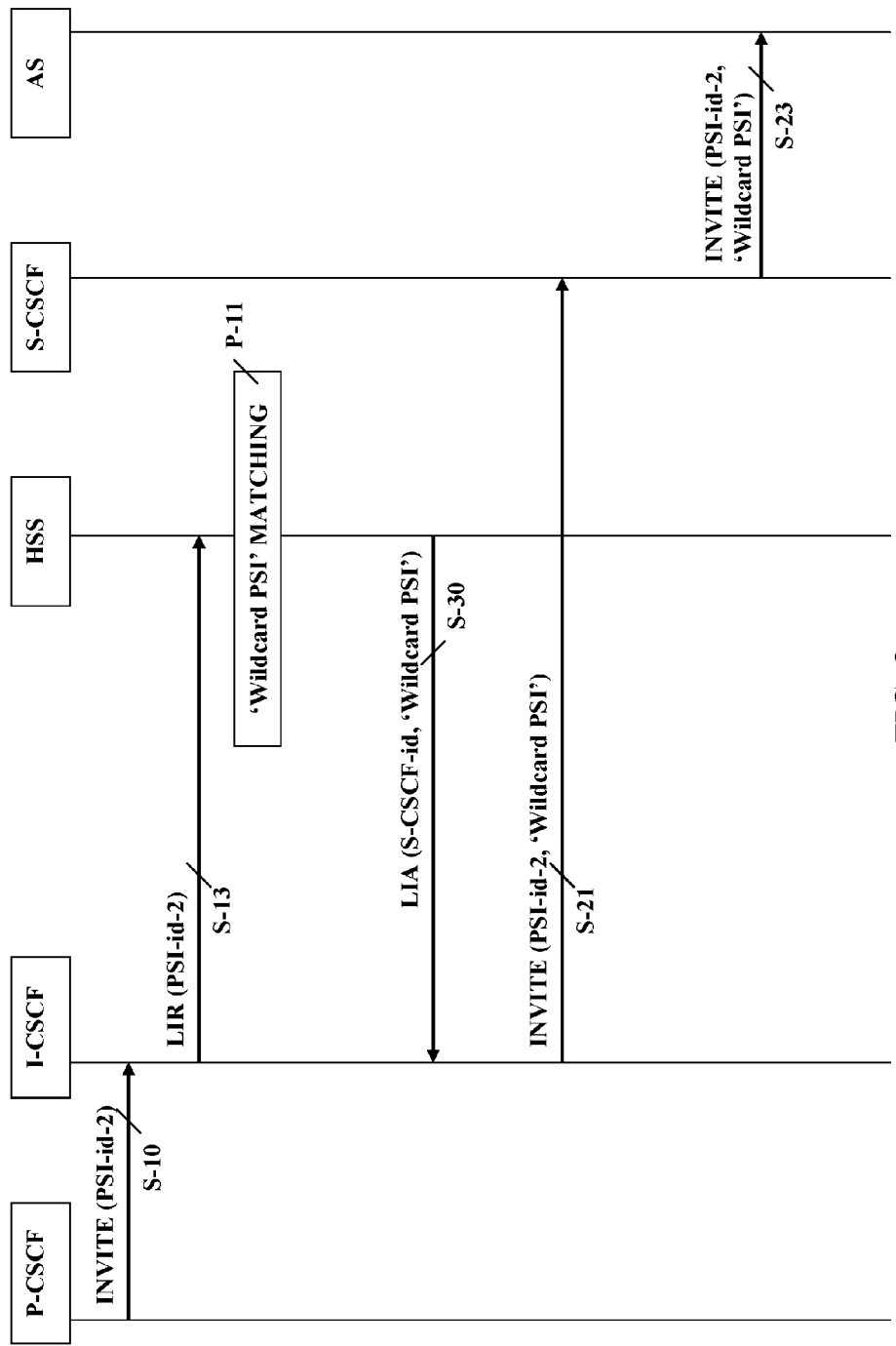
FIG. 3 illustrates a basic signalling flow describing how a given Public Service Identity belonging to a 'Wildcard PSI' range may be treated in a network with only one HSS in accordance with a second embodiment of the invention.

A second embodiment of the invention illustrated in FIG. 3, shows how further service invocations (S-10) with Public Service Identities (PSI-id-2) other than the previously given Public Service Identity (PSI-id) may be treated in accordance with the invention when the other Public Service Identities (PSI-id-2) belong to the same 'Wildcard PSI' range as the previously given Public Service Identity (PSI-id). Under this second embodiment, the routing of a service invocation merely requires one checking procedure (P-11) to determine in the HSS, upon interrogation (S-13) from the routing entity (I-CSCF), that the 'Wildcard PSI', which the currently given Public Service Identity (PSI-id-2) belongs to, had been previously assigned an identifier (S-CSCF-id) of the serving entity (S-CSCF) currently handling all Public Service Identities belonging to the 'Wildcard PSI'.

In this situation, the HSS may answer (S-30) to the routing entity (I-CSCF) with the identifier (S-CSCF-id) of the serving entity (S-CSCF) already assigned for handling all Public Service Identities belonging to the 'Wildcard PSI', as the currently given Public Service Identity (PSI-id-2) does, along with said 'Wildcard PSI'. The routing entity does not need to select a serving entity, and simply forwards (S-21) the service invocation (INVITE) towards the assigned serving entity (S-CSCF) with the currently given Public Service Identity (PSI-id-2) and the 'Wildcard PSI', which said currently given Public Service Identity belongs to.

The serving entity (S-CSCF) receiving (S-21) this invocation finds that the given 'Wildcard PSI' is known therein, and the serving entity had already got a common service profile to be applied for all the Public Service Identities belonging to said 'Wildcard PSI', so that the serving entity requires neither being assigned at the HSS to the currently given Public Service Identity (PSI-id-2) nor obtaining from the HSS an individual service profile for the latter. Then, the serving entity (S-CSCF) gets from the previously stored common service profile associated with the received 'Wildcard PSI' an identifier of an Application Server (AS) where a service identified by the given Public Service Identity (PSI-id-2) is executed, and eventually forwards (S-23) the service invocation (INVITE) to said Application Server (AS) including the received 'Wildcard PSI'.

Also under this second embodiment, the Application Server (AS) receiving the 'Wildcard PSI' may, depending on particular criteria and implementation options, apply unique service logic for all Public Service Identities within the received 'Wildcard PSI' so that no further checking and matching procedure is required.

Figure 4:
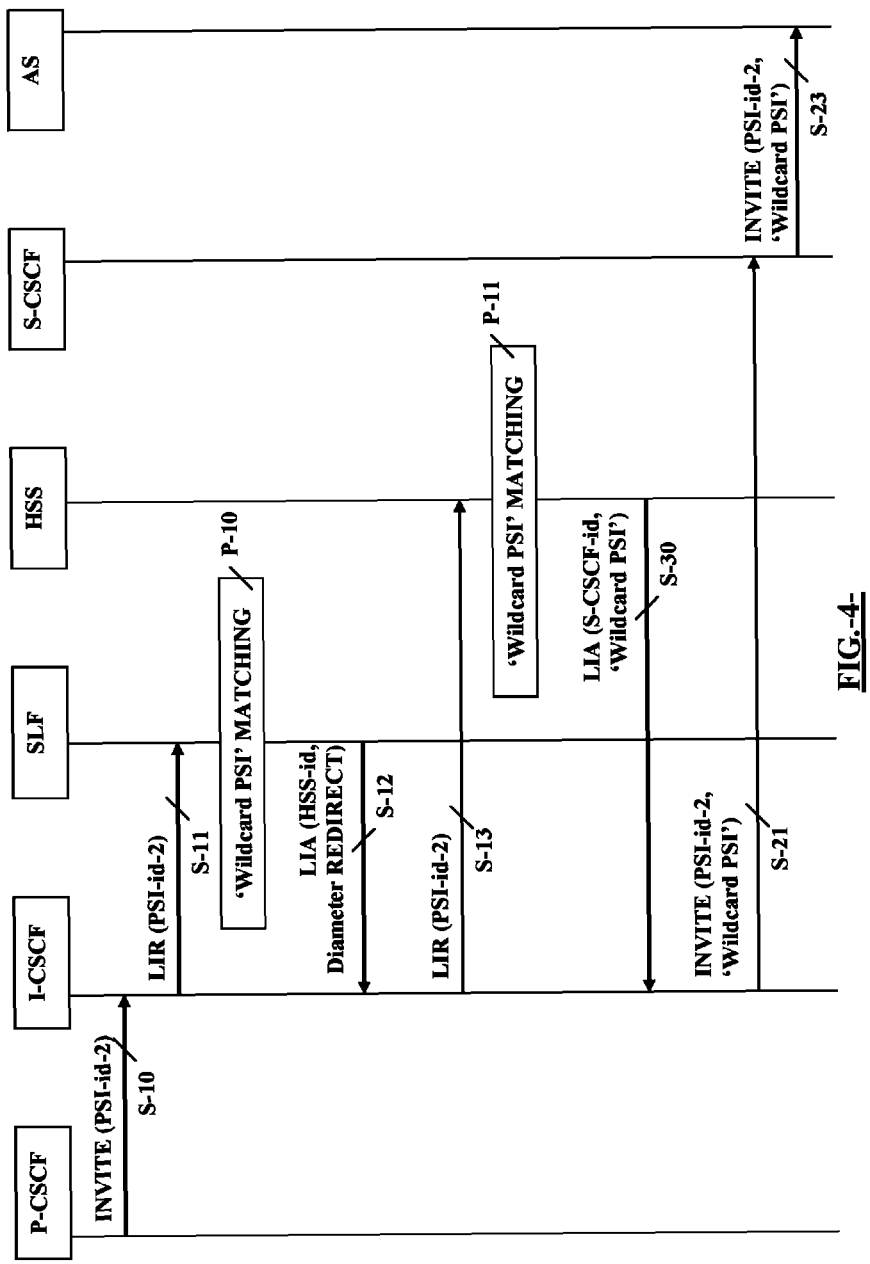
FIG. 4 illustrates a basic signalling flow describing how a given Public Service Identity belonging to a 'Wildcard PSI' range may be treated in a network with more than one HSS in accordance with a second embodiment of the invention.

As for the first embodiment, this second embodiment is also applicable to an IMS network with more than one HSS, as illustrated in FIG. 4, wherein the routing entity (I-CSCF) firstly interrogates (S-11) a central network entity (SLF), preferably with a Location Info Request (LIR), the interrogation including the currently given Public Service Identity (PSI-id-2) in order to identify the HSS holding said Public Service Identity (PSI-id-2). The central network entity (SLF) returns (S-12) an indication to redirect the service invocation towards an indicated HSS (HSS-id), preferably with a Location Info Answer (LIA). Then, the procedure goes on as described above under the sequence illustrated in FIG. 3.

A third embodiment of the invention, as FIG. 5 illustrates, is especially advantageous for networks with more than one HSS. Under this third embodiment an invocation (INVITE) of service identified by a given Public Service Identity (PSI-id) is received (S-10) at a routing entity of the IMS network, as an Interrogating Call Session Control Function (I-CSCF) may be, from an access entity such as a Proxy Call Session Control Function (P-CSCF) where a user accesses the IMS network through. The routing entity (I-CSCF) firstly determines which is the HSS in charge of said given Public Service Identity (PSI-id) by interrogating (S-11) a central network entity (SLF) with the given Public Service Identity (PSI-id), the interrogation being preferably a Location Info Request (LIR).

The central network entity (SLF) carries out a checking procedure and determines that the given Public Service Identity (PSI-id) matches (P-10) within a 'Wildcard PSI' range defined in the central entity as held by a certain HSS. The central entity (SLF), in accordance with an aspect of the invention, returns (S-40) towards the routing entity (I-CSCF) an indication to redirect the service invocation towards an indicated HSS, an identifier of said HSS (HSS-id), and including the 'Wildcard PSI'. This submission preferably done with a Location Info Answer (LIA).

The routing entity (I-CSCF) then interrogates (S-41) the indicated HSS, preferably with a Location Info Request (LIR), and including the given Public Service Identity (PSI-id) and the received 'Wildcard PSI'.

The HSS receiving an interrogation that includes a 'Wildcard PSI' does not need a complete checking procedure to match a received Public Service Identity but simply determine whether a serving entity (S-CSCF) had been already assigned to said 'Wildcard PSI'. Provided that the serving entity (S-CSCF) had been already assigned for handling all Public Service Identities belonging to the 'Wildcard PSI', an identifier (S-CSCF-id) of the assigned serving entity along with the 'Wildcard PSI' is sent back (S-30) to the routing entity (I-CSCF).

The routing entity (I-CSCF) forwards (S-21) the service invocation (INVITE) towards the assigned serving entity (S-CSCF) with the given Public Service Identity (PSI-id) and the 'Wildcard PSI'. The serving entity (S-CSCF) receiving (S-21) this invocation finds that the given 'Wildcard PSI' is already associated at the serving entity with a common service profile to be applied for all the Public Service Identities belonging to said 'Wildcard PSI'. The serving entity (S-CSCF) does not need to be assigned at the HSS for given Public Service Identity (PSI-id), and does not need to obtain from the HSS an individual service profile for the latter. Then, the serving entity (S-CSCF) gets from the common service profile, which is associated with the received 'Wildcard PSI', an identifier of an Application Server (AS) where a service identified by the given Public Service Identity (PSI-id) is executed, and eventually forwards (S-23) the service invocation (INVITE) to said Application Server (AS) including the received 'Wildcard PSI'.

Also under this third embodiment illustrated in FIG. 5, the Application Server (AS) receiving the 'Wildcard PSI' may, depending on particular criteria and implementation options, apply unique service logic for all Public Service Identities within the received 'Wildcard PSI' so that no further checking and matching procedure is required.

Moreover, as shown at least in the embodiments of FIGS. 3 and 5 and irrespective of having just one or more than one HSS, there is no need for carrying out more than once checking procedures to match a given Public Service Identity (PSI-id; PSI-id-2) received in a service invocation (INVITE) with those defined in a network entity (SLF, HSS, AS), the latter being held as a 'Distinct PSI' or as a 'Wildcard PSI'.

A still further enhancement may be obtained by combining the teaching of the second embodiment shown in FIG. 4 with the third embodiment shown in FIG. 5. Thus, in accordance with a fourth embodiment illustrated in FIG. 6, the central entity (SLF) interrogated (S-11) about the HSS holding a given Public Service Identity (PSI-id) may return (S-40) towards the routing entity (I-CSCF) an indication to redirect the service invocation towards an indicated HSS, an identifier of said HSS (HSS-id), and including the 'Wildcard PSI' (Wildcard-PSI-a) which the given Public Service Identity (PSI-id). This submission preferably done, as suggested above, with a Location Info Answer (LIA). The routing entity (I-CSCF) then interrogates (S-41) the indicated HSS, preferably with a Location Info Request (LIR), and including the given Public Service Identity (PSI-id) and the received 'Wildcard PSI' ('Wildcard-PSI-a').

The HSS receiving such interrogation that includes a first 'Wildcard PSI' ('Wildcard PSI-a') may, nevertheless, carry out a checking procedure (P-11) to match the received first 'Wildcard PSI' ('Wildcard PSI-a'), and may determine as a result of this checking procedure (P-11) a second 'Wildcard PSI' ('Wildcard PSI-b') range, which the received first 'Wildcard PSI' ('Wildcard PSI-a') belongs to, or is included in, the received first 'Wildcard PSI' ('Wildcard PSI-a') range.

That is, the second 'Wildcard PSI' ('Wildcard PSI-b') may be defined at the HSS as a sub-range of the received first 'Wildcard PSI' ('Wildcard PSI-a'), and obtained as a result of also applying the checking procedure to match the given Public Service Identity (PSI-id) in combination with the received first 'Wildcard PSI' ('Wildcard PSI-b'), or the second 'Wildcard PSI' ('Wildcard PSI-b') may be defined at the HSS as a range that includes a sub-range represented by the received first 'Wildcard PSI' ('Wildcard PSI-a').

Once said second 'Wildcard PSI' ('Wildcard PSI-b') has been determined (P-11) at the HSS, the HSS determines whether a serving entity (S-CSCF) had been already assigned to the second 'Wildcard PSI' ('Wildcard PSI-b'). Provided that the serving entity (S-CSCF) had been already assigned for handling all Public Service Identities belonging to the second 'Wildcard PSI' ('Wildcard PSI-b'), an identifier (S-CSCF-id) of the assigned serving entity along with the second 'Wildcard PSI' ('Wildcard PSI-b') is sent back (S-30) to the routing entity (I-CSCF). The sequence of actions following this may continue in a similar manner as for the embodiment shown in FIG. 4.

This embodiment illustrated in FIG. 6 allows that the distribution of 'Wildcard PSI' ranges is not necessarily the same at the central network entity (SLF) than in the HSS. Such flexible distribution also allows a more flexible assignation of an S-CSCF to particular 'Wildcard PSI' ranges in an HSS, whereas such ranges are included in just one 'Wildcard PSI' defined as such in the central network entity.

On the other hand, both HSS and serving entity (S-CSCF) are arranged for the HSS to trigger a profile download towards the serving entity, without any explicit request from the latter but rather due to any change of contents in a service profile or any change of Public Service Identities defined in the HSS that, irrespective of being defined as a 'Distinct PSI' or as a 'Wildcard PSI', may affect any association in the serving entity between a service profile and a Public Service Identity.

In accordance with a further embodiment of the invention not shown in any drawing, the central network entity (SLF) might also return, upon a routing query based on a given Public Service Identity, an identifier of the Application Server where the service identified by the given Public Service Identity is executed. This identifier of the Application Server might also be submitted, directly or indirectly and upon definition or amendment, towards the HSS, or towards any serving entity (S-CSCF) in the network.

The central network entity, under any of the above embodiments, may be a centralized entity in a network with more than one HSS, the central entity carrying out a subscription locator function, that is, informing about the HSS in charge of a given subscription. In this case, the central entity may have as well means for answering a routing query for a given Public User Identity with an identifier of a Home Subscriber Server (HSS-id) holding the subscription for the corresponding user.

In a similar embodiment, and for networks configured to allow a direct routing from the routing entity (I-CSCF) to the Application Server, the HSS might return, upon a routing query based on a given Public Service Identity, an identifier of the Application Server where the service identified by the given Public Service Identity is executed, instead of an identifier of a serving entity (S-CSCF) currently handling the service invocation.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A Serving Call Session Control Function (S-CSCF) entity assignable for handling a service identified by a Public Service Identity (PSI), the S-CSCF entity comprising:
   a processor; and
   a memory containing instructions that, when executed by the processor, cause the S-CSCF entity to:
      receive, from an Interrogating Call Session Control Function (I-CSCF) entity, an INVITE message for a service identified by a given PSI, the INVITE message including an identifier of a Wildcard PSI range to which the given PSI belongs;
      determine that a common service profile is not already available for the Wildcard PSI range; and
      in response to the determination that the common service profile is not already available for the Wildcard PSI range:
         transmit a Server Assignment Request (SAR) message, to a Home Subscriber Server, the SAR message including the identifier of the Wildcard PSI range; and
         receive from the Home Subscriber Server, with a Server Assignment Answer (SAA) message, a common service profile associated with the Wildcard PSI range.

2. The S-CSCF entity of claim 1, wherein the instructions, when executed by the processor, further cause the S-CSCF entity to determine whether a particular service profile is already available for the given PSI.

3. The S-CSCF entity of claim 1, wherein the instructions, when executed by the processor, further cause the S-CSCF entity to obtain from the common service profile associated with the Wildcard PSI range an identifier of an Application Server where a service identified by the given PSI is to be executed.

4. The S-CSCF entity of claim 1, wherein the instructions, when executed by the processor, further cause the S-CSCF entity to forward the received INVITE message towards an Application Server for executing the service identified by the given PSI, the INVITE message including the identifier of the Wildcard PSI range to which the given PSI belongs.

5. A method for invoking a service identified by a Public Service Identity (PSI) in a network, the method applying at a Serving Call Session Control Function (S-CSCF) entity, which handles the service, and comprising:
   receiving, from an Interrogating Call Session Control Function (I-CSCF) entity, an INVITE message for a service identified by a given PSI, the INVITE message including an identifier of a Wildcard PSI range to which the given PSI belongs;
   determining that a common service profile is not already available for the Wildcard PSI range; and
   in response to determining that the common service profile is not already available for the Wildcard PSI range:
      transmitting a Server Assignment Request (SAR) message, to a Home Subscriber Server, the SAR message including the identifier of the Wildcard PSI range; and
      receiving from the Home Subscriber Server, with a Server Assignment Answer (SAA) message, a common service profile associated with the Wildcard PSI range.

6. The method of claim 5, wherein the method further comprises determining whether a particular service profile is already available for the given PSI.

7. The method of claim 5, wherein the method further comprises obtaining from the common service profile associated with the Wildcard PSI range an identifier of an Application Server where the service identified by the given PSI is to be executed.

8. The method of claim 5, wherein the method further comprises forwarding the received INVITE message towards an Application Server for executing the service identified by the given PSI, the INVITE message including the identifier of the Wildcard PSI range to which the given PSI belongs.

* * * * *

UNITED STATES PATENT AND TRADEMARK OFFICE
CERTIFICATE OF CORRECTION

PATENT NO. : 9,942,192 B2
APPLICATION NO. : 15/163081
DATED : April 10, 2018
INVENTOR(S) : Blanco Blanco et al.

Page 1 of 1

It is certified that error appears in the above-identified patent and that said Letters Patent is hereby corrected as shown below:

On the Title Page

In item (72), under "Inventors", in Column 1, Line 2, delete "del Jarama" and insert -- de Jarama --, therefor.

On Page 2, in item (56), under "OTHER PUBLICATIONS", in Column 1, Line 7, delete "(UMTS:" and insert -- (UMTS): --, therefor.

In the Specification

In Column 1, Line 7, delete "2014," and insert -- 2014, now U.S. Pat. No. 9,380,450, --, therefor.

In Column 10, Line 50, delete "('Wildcard PSI-b')," and insert -- ('Wildcard PSI-a'), --, therefor.

Signed and Sealed this
Twenty-fourth Day of July, 2018

Andrei Iancu
*Director of the United States Patent and Trademark Office*